J. G. CLEMENS.
SOLDERING APPARATUS.
APPLICATION FILED FEB. 25, 1916.
1,204,131.
Patented Nov. 7, 1916.
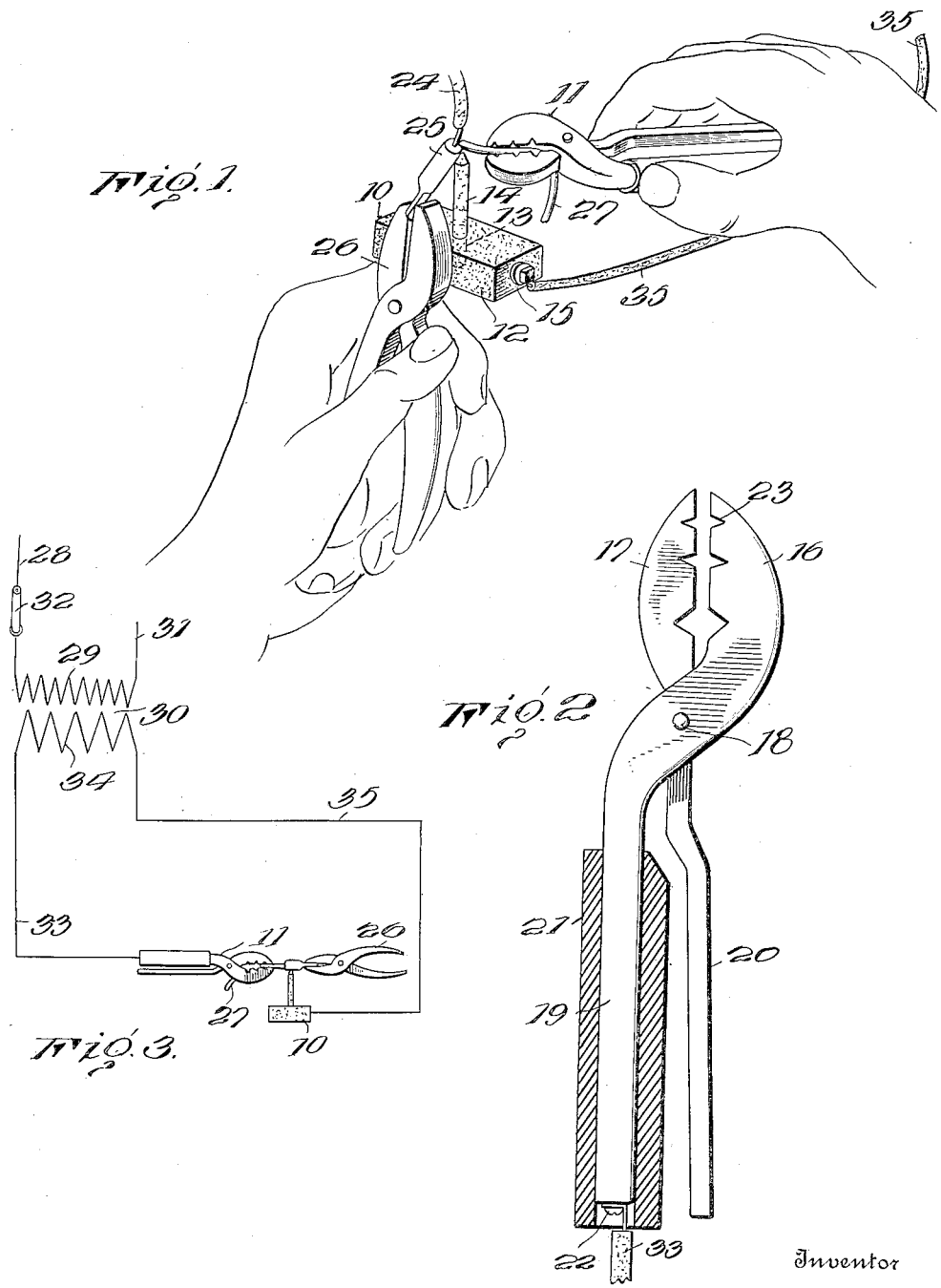
Inventor
J. G. Clemens.
By
, Attorneys.

UNITED STATES PATENT OFFICE.

JOHN G. CLEMENS, OF BUFFALO, NEW YORK.

SOLDERING APPARATUS.

1,204,131. Specification of Letters Patent. Patented Nov. 7, 1916.

Application filed February 25, 1916. Serial No. 80,451.

*To all whom it may concern:*

Be it known that I, JOHN G. CLEMENS, a citizen of the United States, residing at Buffalo, in the county of Erie and State of New York, have invented certain new and useful Improvements in Soldering Apparatus, of which the following is a specification.

My present invention relates to new and useful improvements in methods of and apparatus for electrical soldering, the primary object of my invention being the provision of an improved method of soldering in which the current employed passes through the solder being used so that as soon as the solder is removed from the work being operated upon, the circuit will be broken and current thereby saved.

A further object of my invention consists in the provision of a soldering apparatus of such type that the heat electrically developed is developed directly at the part of the metals being soldered, thereby avoiding all waste of energy, due to loss of heat through conduction or radiation.

A further object of the invention consists in the provision of a soldering apparatus, the operation of which is not dependent upon the formation of an electric arc and in which the pieces of metal being jointed form a portion of the heating circuit.

More specifically, my invention includes the provision of a fixed soldering contact of high resistance material, such as carbon, in conjunction with a holder for the piece of string solder, the holder being connected in circuit with the carbon so that when the work to be soldered is brought into simultaneous engagement with the carbon contact point and solder held in the holder, the circuit will be completed and the solder melted.

In this connection, a further object of my invention consists in providing a novel method of mounting a carbon contact point in such a manner that the point, if injured, may be readily renewed. And a still further object of my invention consists in the provision of a novel form of insulated pliers for holding the solder.

With these and other objects in view, my invention will be more fully described, illustrated in the accompanying drawings, and then specifically pointed out in the claims which are attached to and form a part of this application.

In the drawings: Figure 1 is a fragmentary perspective view of the soldering apparatus constructed in accordance with my invention, the apparatus being shown in use; Fig. 2 is an elevation, partially in section, of the solder holding pliers employed; Fig. 3 is a diagrammatic view of the wiring system employed with my soldering apparatus.

Corresponding and like parts are referred to in the following description and indicated in all the views of the drawings by the same reference characters.

As best shown in Fig. 1 of the drawings, my invention consists primarily in two coacting devices 10 and 11, one of which is a holder supporting a contact point of high resistance material and the other of which is a pair of pliers for holding string solder. The holder 10 comprises a substantially rectangular shaped block 12 of any suitable high resistance material, such as carbon, formed in its upper face with a cylindrical socket 13 to receive the lower end of a carbon contact point proper 14 which is supported in vertical position and preferably has its free terminal pointed. This block 12 is preferably bolted or otherwise fixed to a table, bench or other support and is provided with a binding post 15 by means of which one of the wires of the soldering circuit may be attached, as will be later explained.

The pliers 11 may be of any suitable type, but are preferably constructed, as best shown in Fig. 2 of the drawings, and include coacting clamping jaws 16 and 17 pivoted as shown at 18 and having the handles 19 and 20, respectively. One of the handles, in the present instance the handle 20, is inclosed in a sleeve or ferrule 21 of wood or other suitable insulating material and the other handle 19 is offset somewhat to permit closing of the pliers. That handle which has the insulated sleeve is provided at its free end with a binding post 22 by means of which another of the circuit wires may be attached. Preferably, the inner faces of the jaws are provided with a series of transverse notches 23, the depth of which may increase toward the pivotal point of the jaws and, as a rule, the free ends of the jaws are beveled or rounded in order to facilitate their close application to the work being operated upon.

In Fig. 1 of the drawings, I have illustrated the use of my apparatus and there show the bared terminal of an insulated wire 24 being soldered into a terminal socket 25 which is held in engagement with the contact point 14 by a pair of pliers 26, while a length of string solder 27 is held in engagement with the socket 25 by means of the pliers 11. As will be seen by reference to Fig. 3, current is supplied from a line wire 28 leading to one terminal of the primary winding 29 of a transformer 30, the other terminal of which is connected to the return wire 31, a switch 32 being preferably interposed in one of these wires in order to shut off the flow of current when the apparatus is not in use. A wire 33 leads from one terminal of the secondary winding 34 of the transformer to the binding post 22 of the pliers and a wire 35 leads from the binding post 15 of the contact block 12 to the other terminal of the secondary winding of the transformer.

In use, assuming that the switch 32 is closed and that the work to be soldered is held in engagement with the carbon contact 14, it will be clear that the bringing of the end of a piece of string solder into engagement with the work being soldered, the solder being held in the pliers 11, will close a circuit through the wire 33, the pliers 11 and solder 27, the work being soldered, the contact point 14 and its supporting block and the wire 35 back to the transformer.

It should be noted that the string solder employed will melt at a relatively low temperature and its melting is not in any way caused by the passage of current through it, but wholly by the heating of the metal against which it is positioned, due to passage of heat from the carbon contact to such metal, the carbon being highly heated by the passage of current through it. Obviously, contact points of high resistance material, other than carbon, for instance such as carborundum, may be employed and other minor changes may be made without in the slightest degree departing from the spirit of my invention, as set forth in the appended claims.

Having thus described the invention, what is claimed as new is:

1. A soldering apparatus including a block of carbon, means for supplying current to the carbon, the carbon being formed with a socket in one face, a carbon contact member seating in the socket and adapted to be engaged by work being soldered, and a return conductor for the current in the form of a piece of solder also adapted to be brought into engagement with the work.

2. A soldering apparatus including a pair of pliers having grooved jaws and handles, means for connecting a current supply wire to such handle, a piece of string solder adapted to be held in the pliers, a carbon contact member adapted to engage work being soldered, and means for connecting the current return wire to the carbon contact member.

3. In a soldering apparatus, a block of carbon formed with a socket in one face, a contact member of high resistance material having one end seated in the socket and its opposite end formed with a point, and means for connecting a current conducting wire to the block.

4. A soldering apparatus including a contact member of high resistance material adapted to be connected in one arm of a circuit and to be engaged by work being soldered, and a piece of string solder adapted to be connected in the other arm of the circuit and to operate to open and close the circuit by being moved into and out of engagement with the work being soldered.

In testimony whereof I affix my signature.

JOHN G. CLEMENS. [L. s.]